May 22, 1945.  C. T. WALTER  2,376,838
FILLING MACHINE
Filed June 12, 1941  8 Sheets-Sheet 1

ATTEST-

Charles T. Walter
INVENTOR

BY

ATTORNEY

May 22, 1945.	C. T. WALTER	2,376,838
FILLING MACHINE
Filed June 12, 1941	8 Sheets-Sheet 4
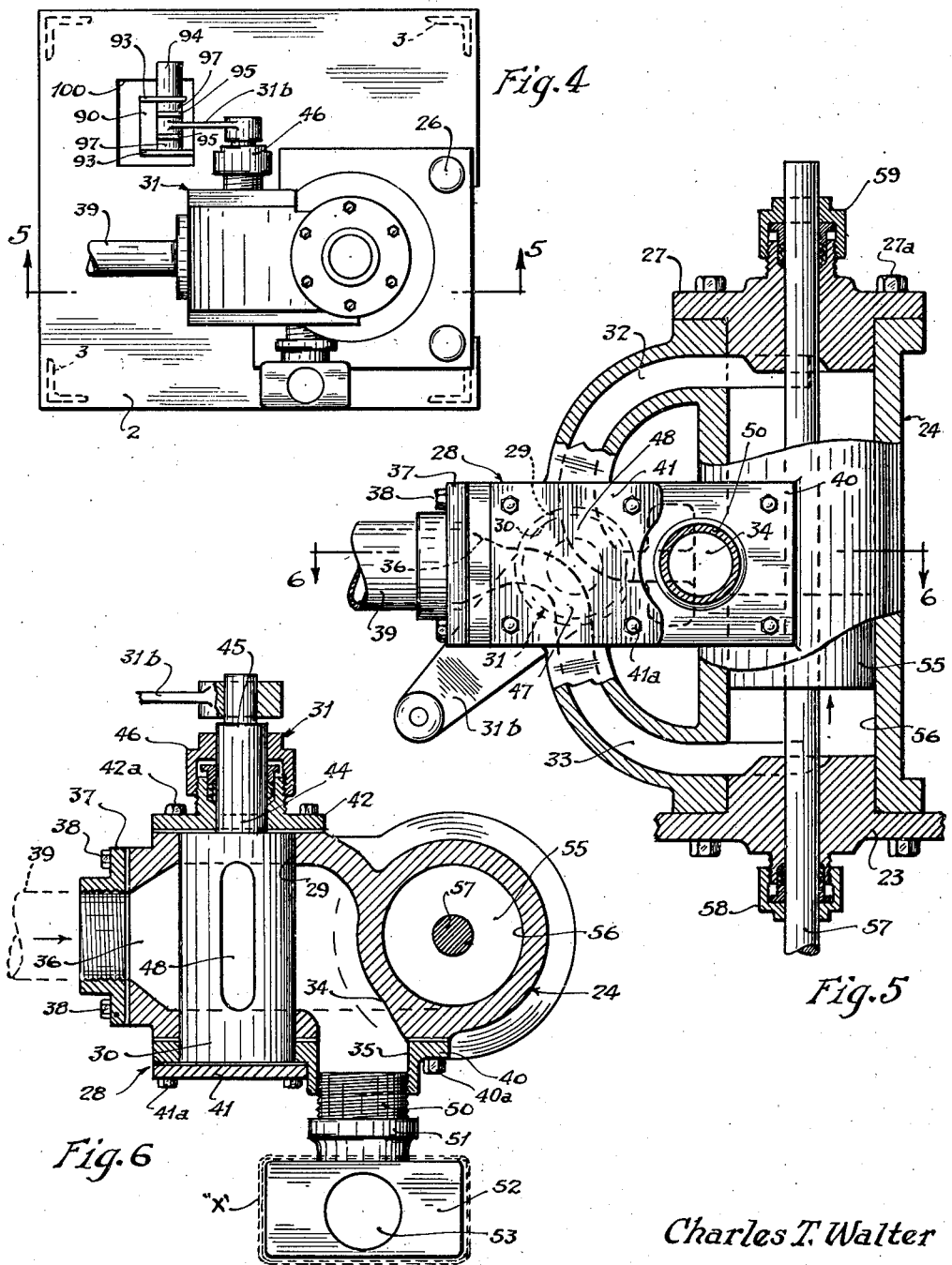
Charles T. Walter
INVENTOR May 22, 1945.   C. T. WALTER   2,376,838
FILLING MACHINE
Filed June 12, 1941   8 Sheets-Sheet 5

ATTEST-

Charles T. Walter
INVENTOR

BY

ATTORNEY

May 22, 1945.  C. T. WALTER  2,376,838
FILLING MACHINE
Filed June 12, 1941  8 Sheets-Sheet 6
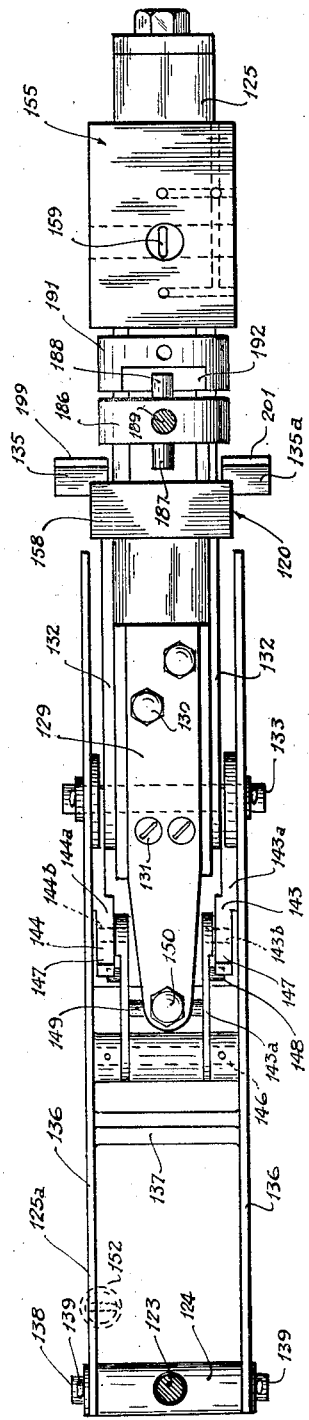
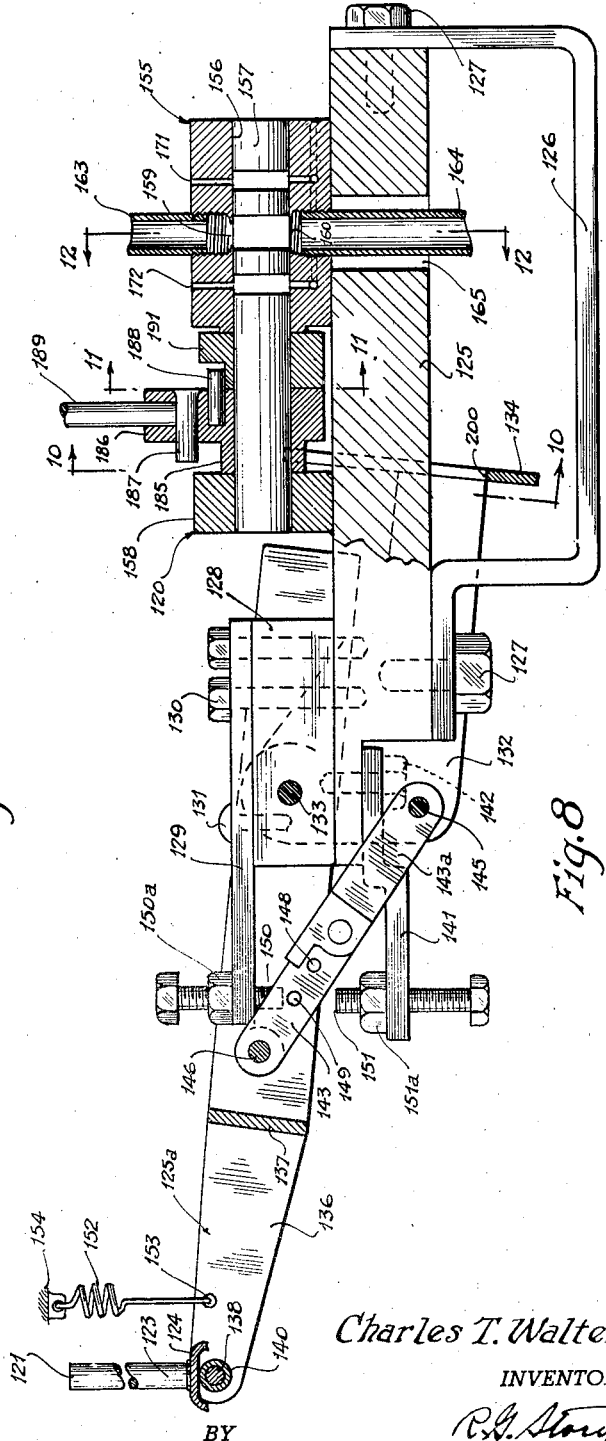
Fig. 9
Fig. 8
Charles T. Walter
INVENTOR
ATTEST
BY
ATTORNEY May 22, 1945.　　　　C. T. WALTER　　　　2,376,838
FILLING MACHINE
Filed June 12, 1941　　　　8 Sheets-Sheet 7
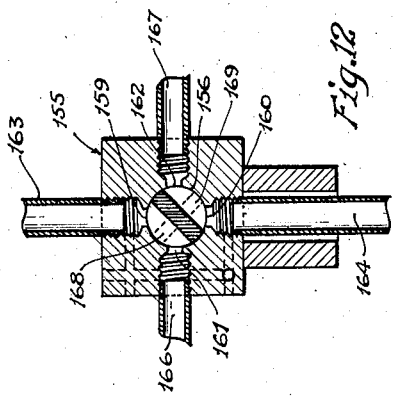
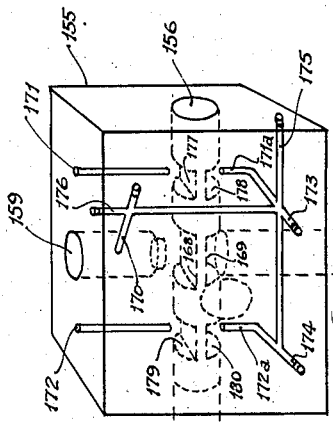
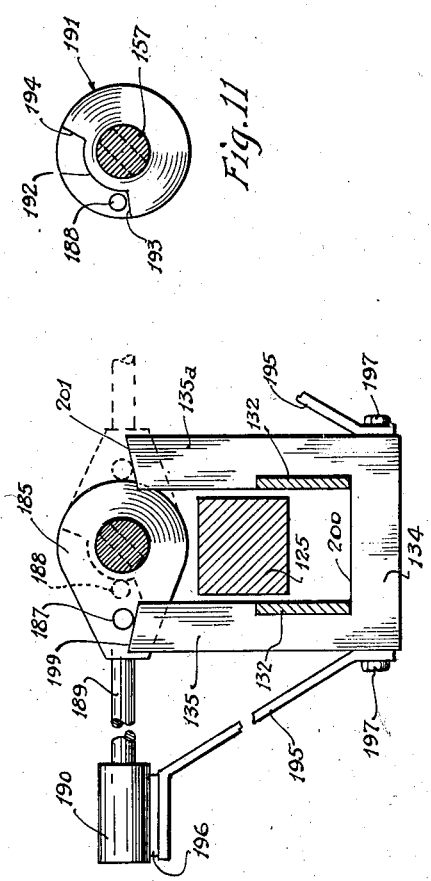
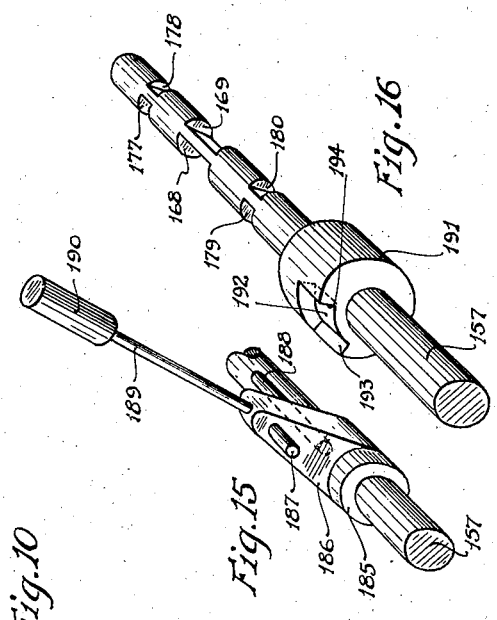
Charles T. Walter
INVENTOR
R. J. Story
ATTORNEY Patented May 22, 1945

2,376,838

UNITED STATES PATENT OFFICE 2,376,838

FILLING MACHINE

Charles T. Walter, Chicago, Ill., assignor to Industrial Patents Corporation, Chicago, Ill., a corporation of Delaware Application June 12, 1941, Serial No. 397,690

11 Claims. (Cl. 226—27)

This invention relates to apparatus for filling containers, and more particularly to apparatus adapted to fill containers with a desired volume or mass of plastic or semi-solid material.

More specifically, the invention relates to apparatus for filling containers with products such as ground cheese, ground meat, and the like, which are very "stiff" and have very little or no inherent "flow" characteristics. In the packing industry, containers are usually filled with such material by the aid of cylinders of the type commonly employed in sausage stuffers which, for structural reasons, are limited to about 75 to 100 pounds per square inch pressure on the piston. Such pressures are inadequate for causing stiff products to move at a practical rate through the passageways of the filling apparatus into the bore of the metering cylinder and to actuate the metering piston to force the material out of the metering cylinder into another set of passageways into the container being filled. Hence, filling operations could be conducted with such apparatus only by the use of undesirable excessive pressures. In accordance with the present invention, instead of employing such excessive pressures to actuate the piston of the metering cylinder, independent power means in the form of an air-operated booster cylinder is employed for positively moving the metering piston back and forth in the metering cylinder to rapidly and forcibly displace the material therefrom.

Briefly, the invention comprises a metering cylinder adapted to have plastic or semi-solid material introduced there-into under pressure. A metering piston is reciprocably mounted in the metering cylinder to displace material therefrom. Means, such as a sausage stuffing press, is utilized to force the stiff material into the metering cylinder on the trailing side of the metering piston. The metering cylinder is preferably of the double-acting type in order to speed up production, but a single-acting cylinder is within the scope of the invention. The admission of material into and the discharge of material from the metering cylinder is controlled by a suitable valve, such as a four-way valve. A booster cylinder containing a booster piston connected to said metering piston is provided to forcibly reciprocate the metering piston in the metering cylinder to displace a predetermined quantity of material therefrom on each stroke of the piston, it being understood that while the metering piston is forcing material out of one end of the metering cylinder, the means for introducing material under pressure into the metering cylinder is refilling the bore of the metering cylinder on the trailing side of the metering piston. A suitable valve, such as a four-way valve, controls the admission and exhaust of operating fluid to the booster cylinder and this valve is interconnected with the valve of the metering cylinder so that the action of the pistons in the two cylinders is synchronized. The booster piston is preferably operated by air under pressure because air lends itself to speedy operation; although the term "fluid" as used herein is intended to be broad enough to include slower acting hydraulic actuation. In order to lighten the task of the operator and to speed up operation of the apparatus, the control valves of the metering and booster cylinders are actuated by a power cylinder, which in turn is controlled by another valve, such as a four-way valve, operable at the will of the operator, or, in accordance with a modified form of the invention, operable automatically upon the positioning of an empty container in filling position.

The principal object of the invention is to provide an apparatus suitable for filling containers with plastic or semi-solid products having very little or no inherent "flow" characteristics, such as ground cheese, ground meat, etc., which ordinarily do not lend themselves to quick and efficient packing.

Another object of the invention is to provide a container-filling machine capable of handling plastic or semi-solid materials more rapidly and efficiently than has been possible heretofore.

Another object of the invention is to provide a container-filling apparatus capable of metering and discharging a predetermined volume of plastic or semi-solid material into a container.

Still another object of the invention is to provide a container-filling apparatus which is rapid and positive in its operation and which can be adjusted to vary the volume of material discharged from the metering cylinder, as desired.

A further object of the invention is to provide a container-filling apparatus adapted to receive material under pressure in the metering cylinder thereof and which is provided with power means for forcibly ejecting a predetermined volume of such material from said cylinder.

A still further object of the invention is to provide a manually controlled container-filling apparatus operable at the will of the operator.

Still another object of the invention is to provide a container-filling apparatus which operates automatically upon the positioning of an empty container in filling position.

Still another object of the invention is to provide a container-filling apparatus arranged and constructed so that it is easy to operate and which requires only a minimum of effort on the part of the operator.

Another object of the invention is to provide a semi-automatic valve for controlling the operation of container-filling apparatus and the like.

A further object of the invention is to provide a novel actuating mechanism for said semi-automatic valve.

A still further object of the invention is to provide a valve construction in which the pressure acting upon the core thereof is balanced.

Other and further objects of the invention will be apparent from the following description taken in conjunction with the accompanying drawings in which:

Fig. 4 is a plan view of the apparatus;

Fig. 5 is an enlarged view, partly in section, taken through the metering cylinder on the line 5—5 of Fig. 4;

Fig. 6 is a transverse sectional view through the metering cylinder taken on the line 6—6 of Fig. 5;

Fig. 8 is a side elevational view, partly in section, of the semi-automatic valve employed to control the operation of the power cylinder;

Fig. 9 is a plan view of the valve shown in Fig. 8;

Fig. 10 is a sectional view through the valve taken on the line 10—10 of Fig. 8;

Fig. 11 is a sectional view taken on the line 11—11 of Fig. 8;

Fig. 12 is a sectional view taken on the line 12—12 of Fig. 8;

Fig. 13 is a diagrammatic perspective view particularly illustrating the arrangement of the main and balancing ports of the valve block and valve core of the semi-automatic control valve;

Fig. 15 is a perspective view of the pendulum or operating arm for actuating the semi-automatic control valve; and Fig. 16 is a perspective view of the core of the semi-automatic control valve.

Figure 1:
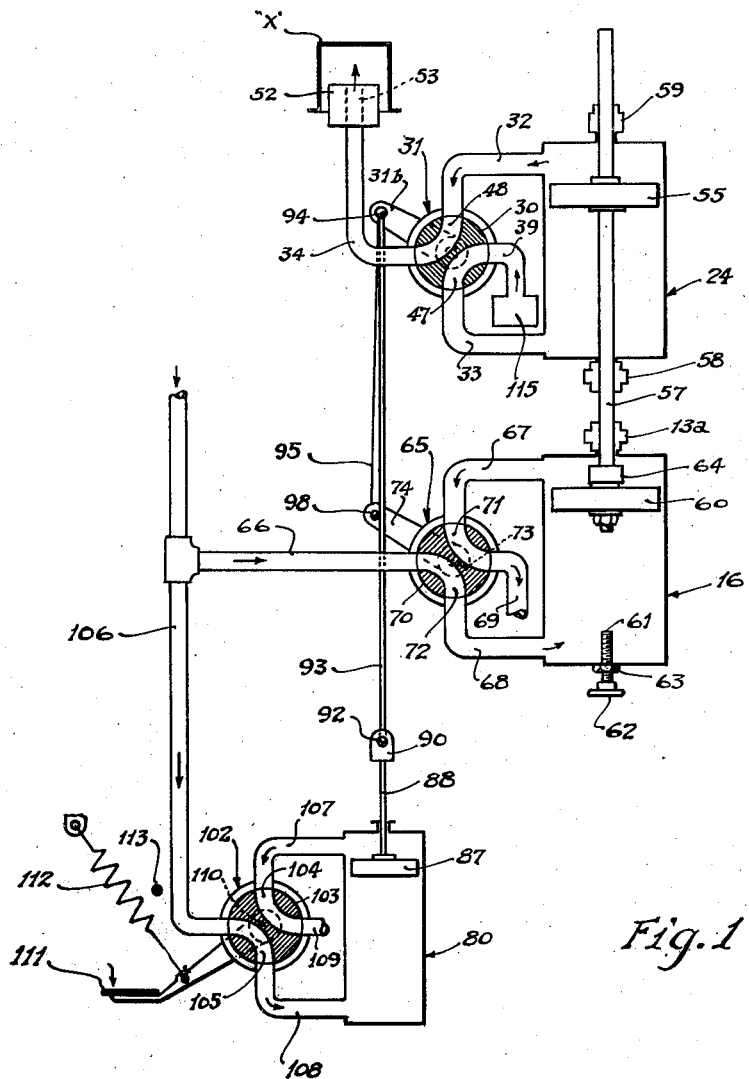
Fig. 1 is a diagrammatic view illustrating one form of container-filling apparatus embodying the principles of the present invention.
Figure 2:
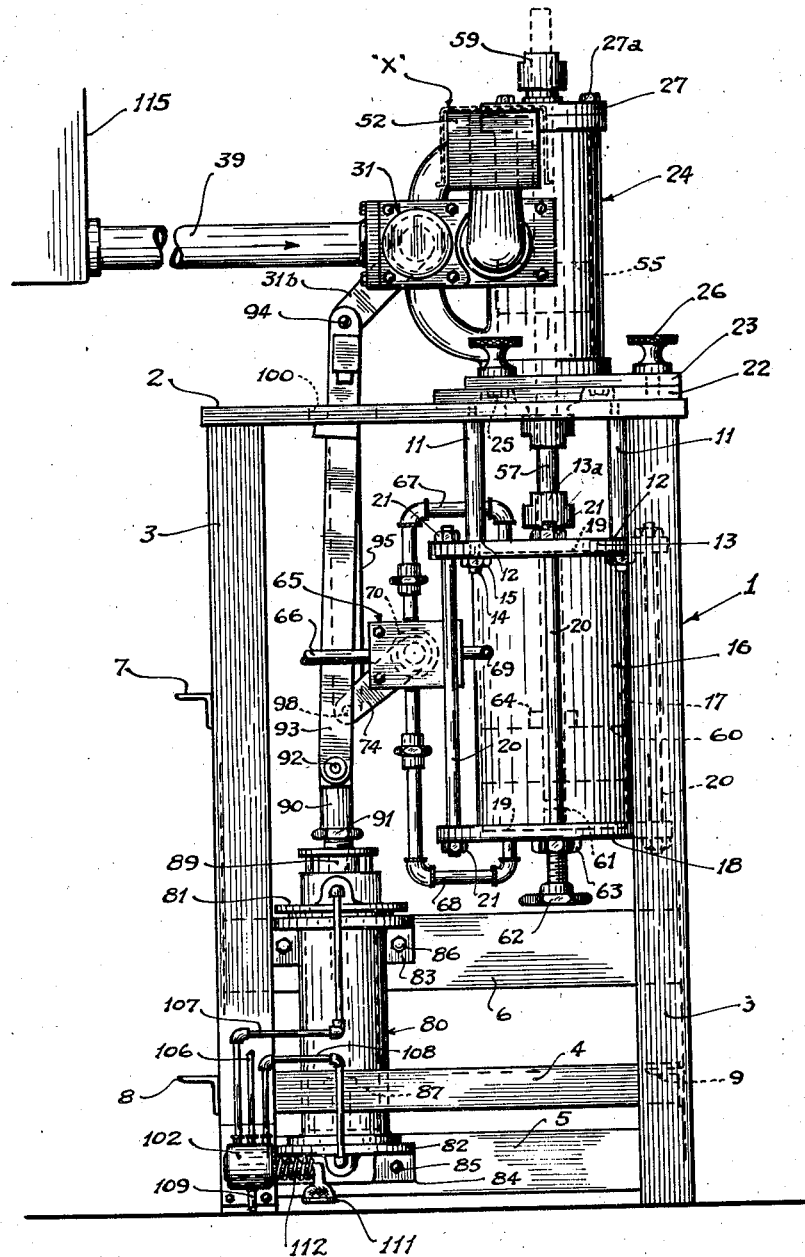
Fig. 2 is a front elevational view of the container-filling apparatus.
Figure 3:
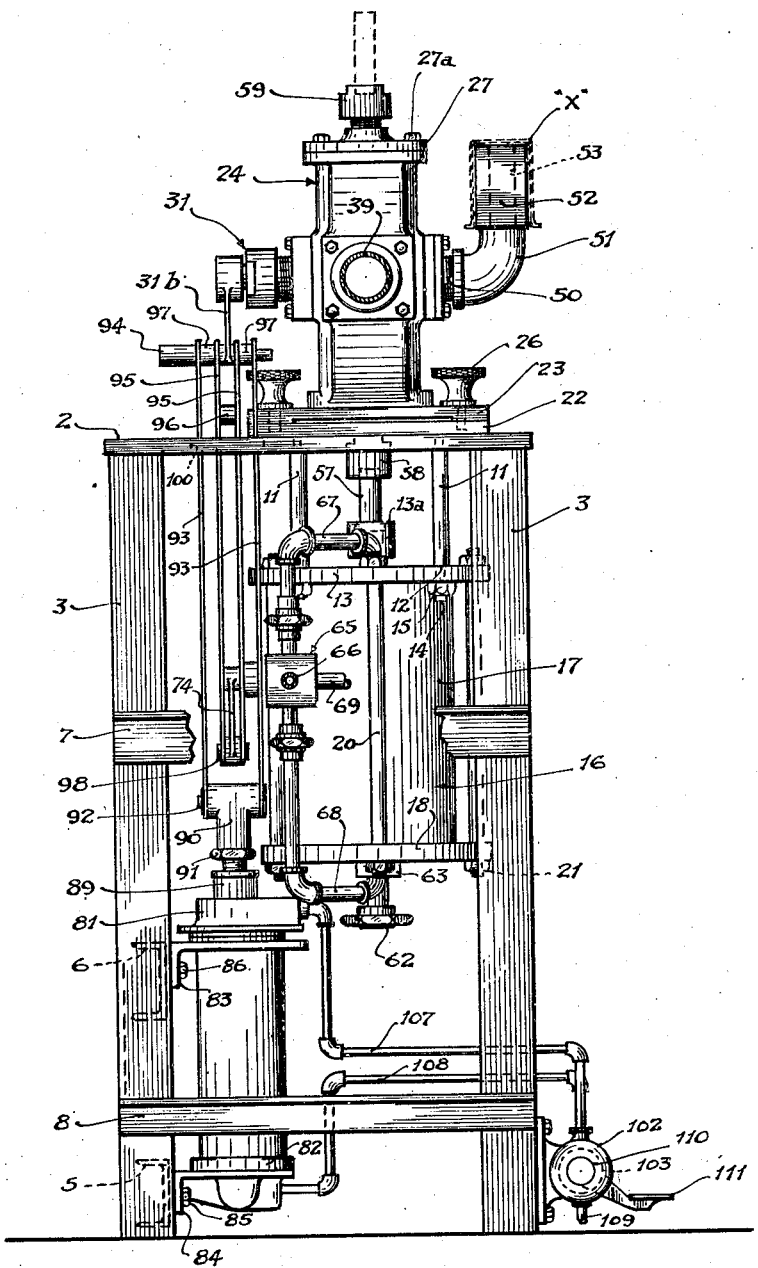
Fig. 3 is an elevational view of the left side of the container-filling apparatus shown in Fig. 2.

Referring now to Figs. 1 to 4 of the drawings, the container-filling apparatus is designated generally by the numeral 1 and comprises a rectangular horizontal platform 2 supported upon four uprights 3, one positioned at each corner thereof. These uprights may consist of angle iron, as shown.

The uprights 3 are connected at the front of the machine by a strip of angle iron 4 and are joined at the rear of the machine by channel sections 5 and 6, which support a valve-actuating power cylinder, as will be described more fully hereinafter. The uprights 3 are further connected at the left side of the machine by strips of angle iron 7 and 8 and are connected at the right side of the machine by a strip of angle iron 9. It will be understood that the platform 2, uprights 3, and the various bracing members 4 to 9, inclusive, may be bolted, welded, or otherwise suitably secured together to assure a rigid construction.

A plurality of studs 11 are threaded or otherwise secured at their upper end to the platform 2. The lower end of each of the studs 11 is provided with a shoulder 12 serving as an abutment for a booster cylinder head 13. A threaded portion 14 extends through the cylinder head 13 and a nut 15 threaded upon said portion clamps the cylinder head 13 against the shoulders 12.

The cylinder head 13 forms a closure for one end of a booster cylinder 16. This cylinder further comprises a cylindrical shell 17 and a lower cylinder head 18. Each of the cylinder heads 13 and 18 is provided with an annular groove 19 (Fig. 2) adapted to receive therein one end of the shell 17. The cylinder heads 13 and 18 are clamped together and maintained in assembled relation with the shell 17 by a series of tie rods 20 extending through the respective heads and carrying clamping nuts 21 upon the opposite ends thereof.

A base plate 22 is suitably mounted upon the platform 2 and forms a support for an enlarged lower head 23 of a metering cylinder 24. The head 23 is secured to the cylinder 24 by bolts 25 and in turn is secured to the base plate 22 by hand bolts 26. An upper cylinder head 27 forms a closure for the upper end of the metering cylinder 24 and this head is secured in place by a series of bolts 27a.

The internal construction of the metering cylinder 24 is best shown in Figs. 5 and 6. It will be noted from these figures that the metering cylinder 24 includes a medial laterally extending portion 28 provided with a circular bore 29 adapted to receive the core 30 of a four-way valve 31. The bore 29 communicates with the upper and lower portions of the metering cylinder 24 through arcuate passageways 32 and 33, respectively. The bore 29 also communicates with a lateral discharge passageway 34. The bore 29 still further communicates with an inlet passageway 36 arranged in the same horizontal plane as the discharge passageway 34. A flanged fitting 37 is secured to an end face of the medial portion 28 by bolts 38 and an inlet pipe 39 is suitably secured in the fitting 37.

The valve core 30 (Fig. 6) is retained in the valve bore 29 in the cylinder portion 28 by a fitting 40 and a cooperative plate 41 disposed at one end of said bore, and by a flanged fitting 42 at the opposite end of said bore. The plate 41 is solid and completely obstructs the bore and is secured to the metering cylinder 24 by bolts 41a which, incidentally, also pass through the fitting 40. Additional bolts 40a pass only through the fitting 40 to further secure the same to the metering cylinder 24. The flanged fitting 42 is secured to the metering cylinder 24 by bolts 42a and is provided with a central opening 44 for the reception of a stem 45 projecting axially from the valve core 30. Leakage from the valve bore 29 along the valve stem 45 is prevented by a suitable stuffing box generally indicated by the numeral 46.

The valve core 30 is provided with arcuate ports 47 and 48 (Fig. 5) adapted to register with the passageways 32, 33, 34 and 36, as will be explained more fully hereinafter.

A pipe nipple 50 has one end thereof threadedly mounted in an opening 35 in the fitting 40 and an elbow element 51 is threadedly mounted upon the opposite end of said pipe nipple. A mandrel or container-filling spout 52 may be formed integral with the elbow 51. The exterior dimensions of the mandrel 52 preferably closely approximate those of the interior of the container X which is to be filled. The mandrel 52 is provided with an upwardly opening discharge orifice 53 arranged so that the empty container X must be placed upon the mandrel in an inverted position.

A metering piston 55 is slidably received in the bore 56 of the metering cylinder 24. The piston 55 is suitably secured to a piston rod 57 which projects through the cylinder heads 23 and 27 and through stuffing boxes 58 and 59, respectively, carried by said heads. The metering piston 55, of course, is sealed against leakage by conventional packing, not shown.

The lower portion of the piston rod 57 (Fig. 2) extends through a stuffing box 13a on the upper cylinder head 13 of the booster cylinder 16 and has a booster piston 60 secured thereto. The lower booster cylinder head 18 carries a threaded stop 61 adapted to limit the downward movement of the piston rod 57. The stop 61 may be adjusted in the cylinder head 18 through a handwheel 62 and locked in adjusted position by a lock nut 63. The upward movement of the piston rod 57 may be limited by a central boss 64 on the piston 60 adapted to engage with the inner surface of the upper booster cylinder head 13.

The booster piston 60 is preferably actuated by air under pressure and the admission and exhaust of such air from the booster cylinder 16 is controlled by a four-way valve 65. This valve is diagrammatically illustrated in Fig. 1. Air under pressure is supplied to the valve 65 through a pipe 66. This air is admitted into the upper portion of the booster cylinder 16 through a pipe 67 and is admitted to the lower portion of said booster cylinder through a pipe 68. Spent or exhaust air is discharged from the valve 65 through a pipe 69.

The booster cylinder control valve 65 comprises a core 70 (Fig. 1) having arcuate ports 71 and 72, adapted to be placed in communication with the pipes 66 to 69, in a manner which will be described more fully hereinafter. The valve core 70 is connected with a valve stem 73 and an operating arm 74 is secured to said stem to effect oscillation of said core.

The actuation of the control valve 31 for the metering cylinder 24 and the control valve 65 for the booster cylinder 16 is effected simultaneously by a power cylinder 80. The power cylinder 80 has heads 81 and 82 at its respective ends. Flanges 83 and 84 serve to mount said cylinder on the machine frame. Thus, the flange 84 is secured to the channel member 5 by suitable bolts 85 and the flange 83 is secured to the channel member 6 by suitable bolts 86.

A power piston 87 is reciprocably mounted in the power cylinder 80 and is connected to one end of a piston rod 88. The opposite end of the piston rod 88 extends through a stuffing box 89 provided at the upper end of the power cylinder 80 and a T-shaped member 90 (Fig. 3) is threadedly mounted upon the upper extremity of said piston rod. The T-shaped member and the piston rod 88 are held in relatively locked relation by a lock nut 91 threadedly mounted upon said rod. Relative adjustment of the member 90 and the rod 88 may be made to vary the stroke of the power piston 87.

A pin 92 extends through the T-shaped member 90 and through the lower end of a pair of long links 93. The upper ends of the links 93 are connected by a pin 94 to one end of the operating arm 31b of the metering cylinder control valve 31. The pin 94 also connects the upper end of a pair of relatively shorter links 95 with the operating arm 31b, the links 95 being held apart by a spacer 96 and the links 95 and 93 being held apart by spacers 97, mounted upon the pin 94. The lower ends of the links 95 are connected by a pin 98 (Fig. 3) to one end of the operating arm 74 of the control valve 65 for the booster cylinder 16. The links 93 and 95 project through an opening 100 formed in the platform 2, as best shown in Fig. 4.

The power piston 87 is preferably actuated by air under pressure and the admission and exhaust of such air from the power cylinder 80 is controlled by a four-way valve 102 (Fig. 1), having a core 103 provided with arcuate ports 104 and 105. Air under pressure is supplied to the valve 102 through a pipe 106 and this air is admitted into the upper portion of the power cylinder 80 through a pipe 107 and is admitted to the lower portion of said cylinder through a pipe 108. Spent or exhaust air is discharged from the valve 102 through a pipe 109. The valve core 103 has a stem 110 which projects exterior of the valve 102 and has a foot pedal 111 secured thereto. A spring 112 is connected to the foot pedal 111 and normally tends to maintain said foot pedal in a raised position against a stop 113.

A device 115, which may be a sausage filling press, or other suitable apparatus, is adapted to continually supply plastic or semi-solid material to the inlet pipe 39 of the metering cylinder 24.

The operation of the aforedescribed apparatus is as follows:

The material to be packed in containers is fed under pressure from the device 115 to the metering cylinder 24 through the inlet pipe 39. An empty container X is placed in inverted position upon the filling mandrel 52. Assuming that the metering cylinder control valve 31, the booster cylinder control valve 65 and the power cylinder control valve 102 are in the position shown in Fig. 1, the container X will have been almost completely filled because the booster piston 60 and the metering piston 55 are almost at the end of their up-stroke.

At the beginning of the filling operation, the power cylinder control valve 102, of course, is in the position shown in Fig. 1, the pedal 111 being held down by the foot of the operator. The port 105 of the valve core 103 is in a position to establish communication between the air supply pipe 106 and the pipe 108, to thus admit air under pressure into the lower end of the power cylinder 80 to cause the power piston 87 to move upwardly. Simultaneously, air is exhausted from above the piston 87 through the pipe 107, port 104 and the exhaust pipe 109. Upward movement of the power piston 87 causes the operating arms 74 and 31b of the booster control valve 65 and the metering cylinder control valve 31, respectively, to assume the position shown through actuation of the links 95 and 93, as will be readily understood.

When the core 70 of the booster cylinder control valve 65 is in the position indicated, the port 72 establishes communication between the air supply pipe 66 and the pipe 68 and allows air under pressure to enter the lower end of the cylinder 16 to force the booster piston 60 upwardly. At the same time, the port 71 establishes communication between the pipe 67 and the exhaust pipe 69 and permits air to be exhausted from the upper side of the booster piston 60. The air under pressure causes the booster piston 60 to move upwardly until the abutment 64 engages with the upper head of the booster cylinder 16. Upward movement of the booster piston 60 produces like movement of the rod 57 and causes the metering piston 55 to be moved upwardly a corresponding distance in the metering cylinder 24. Inasmuch as the port 48 of the metering valve core 30 is now in position to establish communication between the cylinder passageway 32 and the discharge orifice 53 of the container-filling spout or mandrel 52, the material in the cylinder 24 above the piston 55 will be displaced from said cylinder into the container X, forcing the container to rise relatively to the spout as it fills. While the container X is being filled, the operator preferably presses downwardly upon the container to cause the material forced into said container to spread laterally and thereby progressively fill the container.

During the time that material is being discharged through the port 48, the port 47 is in position to establish communication between the inlet pipe 39 and the cylinder passageway 33 so that the device 115 can force material into the metering cylinder 24 to fill the space below the piston 55 as the same is moved upwardly. Thus, the metering cylinder 24 is maintained filled at all times with the material being packed.

As has been previously stated, the material is introduced into the inlet pipe 39 under pressure and this factor may be utilized to assist in the movement of the metering piston 55 in an upward direction. Available sausage stuffing presses and the like, which may be used as the device 115 to introduce material under pressure into the metering cylinder 24, operate at a maximum pressure of about 75–100 pounds per square inch. This pressure, while it is sufficient to introduce stiff material into the metering cylinder 24 is not satisfactory for extruding such material from the metering cylinder. Hence, the extrusion of said material is primarily effected through the use of the booster cylinder which may be designed to provide additional force, or all of the force, required to move the metering piston 55 on its work stroke.

When the metering piston 55 has come to rest, the desired volume of material will have been forced into the container X and this material will substantially fill the container so that by a wiping movement of the container across the top of the mandrel 52 the desired amount of material will be contained in the container, and the material at the orifice 53 will be wiped flush with the top surface of the mandrel. Inasmuch as the material being handled is in a plastic or semi-solid form and, due to the further fact that it has been more or less compacted against the inner walls of the container by resistance offered by the operator during filling, there is not tendency for said material to drop out of the container when it is removed from the mandrel 52 in an inverted position.

Upon the completion of the filling of one container, another empty container is immediately placed over the mandrel 52 and the release of pressure on the foot pedal 111 by the operator will then permit the spring 112 to move said pedal upwardly until it engages the stop 113. Such movement of the foot pedal 111 will position the ports 104 and 105 of the valve 102 so as to cause the power piston 87 to move downwardly and to simultaneously shift the position of the valve operating arms 74 and 31ᵇ of the booster control valve 65 and the metering cylinder control valve 31 downwardly, respectively. It will be apparent that during downward movement of the power piston 87 air under pressure will be admitted to the upper portion of the power cylinder 80 through the pipe 106, valve port 105 and the pipe 107, and that simultaneously spent air will be exhausted from the space below the power piston 87 through the pipe 108, valve port 104 and exhaust pipe 109.

When the power piston 87 has reached its downward limit of travel, the arm 74 on the booster control valve 65 will have moved the valve core 70 so that air will be admitted into the space above the booster piston 60 through the pipe 66, port 71 and pipe 67. Simultaneously, spent air will be exhausted from the space below the booster piston 60 through the pipe 68, port 72 and the exhaust pipe 69. The booster piston 60 will be limited in its downward movement by the engagement of the lower extremity of the connecting rod 57 with the upper end of the adjustable stop 61.

The valve operating arm 31ᵇ of the control valve 31 for the metering cylinder 24 is moved downwardly simultaneously with the movement of the arm 74 of the booster cylinder control valve 65, as has been stated. Hence, as the booster piston 60 moves downwardly, the metering piston 55 will move downwardly the same distance because of the interconnection of the two pistons by the piston rod 57.

The downward movement of the valve operating arm 31ᵇ will position the valve port 48 so that it establishes communication between the passageway 33 and the discharge passageway 34, so that the material on the lower side of the metering piston 55 is forced out of the metering cylinder 24 through the orifice 53 in the mandrel 52 and into the container X. At the same time, the valve port 47 establishes communication between the inlet pipe 39 and the passageway 32 so that a fresh charge of plastic or semi-solid material is introduced under pressure into the metering cylinder 24 in the space above the metering piston 55.

When the metering piston 55 has reached the end of its travel, the container will have been filled and may be removed from the mandrel 52, in the manner previously described. In order to repeat the filling operation it is only necessary for the operator to again depress the foot pedal 111 to position the power cylinder control valve 102 so that the ports thereof assume the position shown in Fig. 1.

The aforedescribed apparatus enables "stiff" materials to be more quickly and efficiently packed with less waste of time than has been possible with previous apparatus; the use of a double acting metering piston and booster means providing for rapid movement of said piston during the time that material is actually being deposited in a container. The introduction of the material under pressure into the bore of the metering cylinder assures that the cylinder will be full at all times and that a uniform quantity of material will be displaced upon each stroke of the piston. Power actuation of the control valves of the metering and booster cylinders also contribute to the speed and efficiency of the machine.

Figure 7:
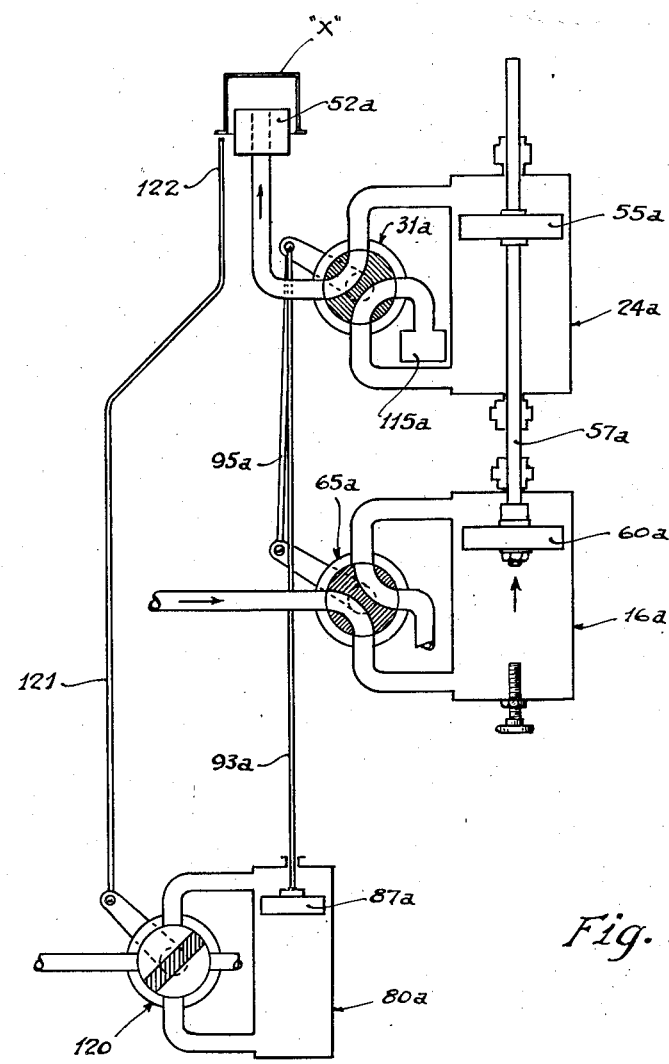
Fig. 7 is a diagrammatic view of a modified form of apparatus in which the power cylinder for controlling the valves of the metering cylinder and booster cylinder is operated semi-automatically and incidental to the positioning of an empty container upon the filling mandrel.
Figure 14:
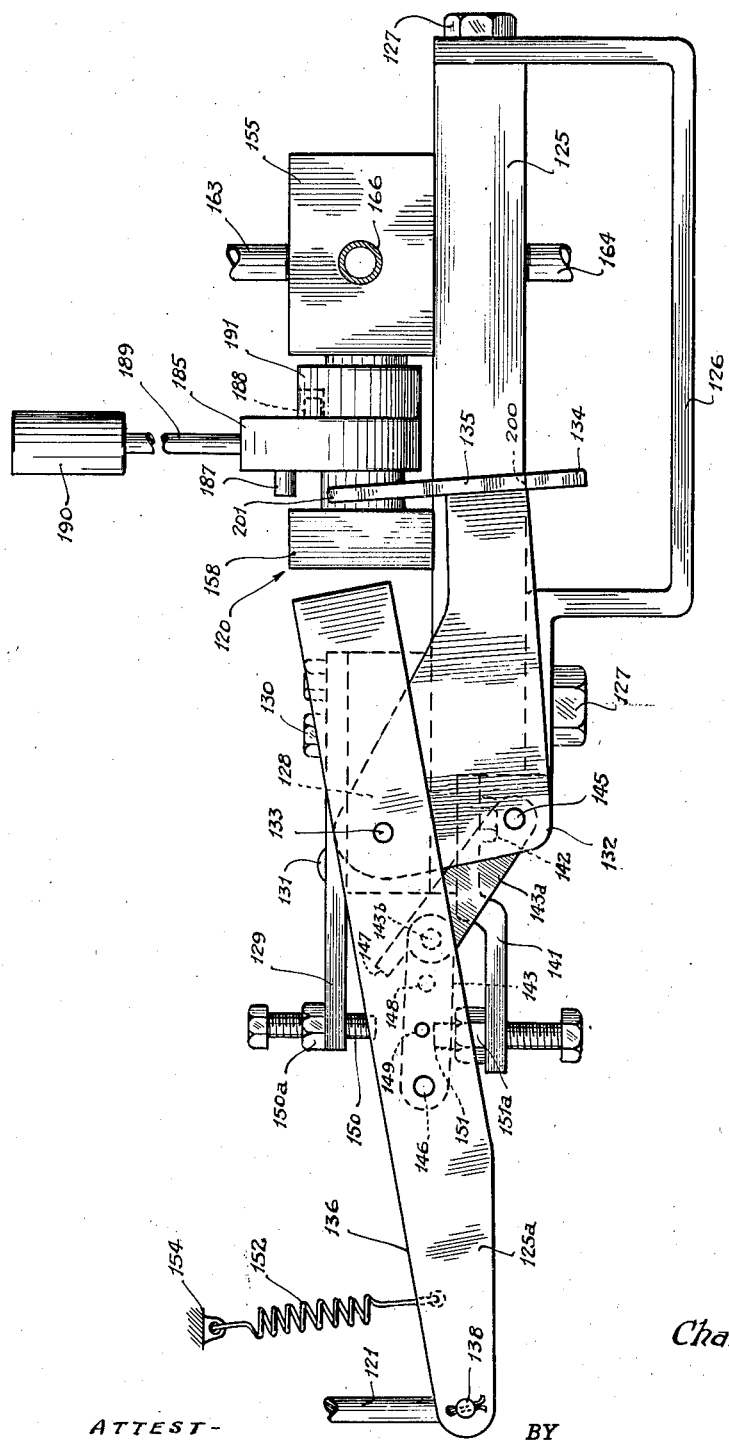
Fig. 14 is a view somewhat similar to Fig. 8 but illustrating the relative position that the parts of the valve mechanism assume during the actuation of the semi-automatic control valve.

A modified form of container-filling apparatus which is substantially automatic in character is illustrated in Figs. 7 to 16 of the drawings. Referring in particular to Fig. 7, a metering cylinder 24ª and a four-way valve 31ª are shown which are similar to the metering cylinder 24 and control valve 31 shown in Fig. 1. Likewise, a booster cylinder 16ª and a four-way valve 65ª for controlling the admission and exhaust of air into said booster cylinder are similar to booster cylinder 16 and valve 65, previously described. A connecting rod 57ª connects a metering piston 55ª with a booster piston 60ª in the manner previously described in connection with Figures 1 to 6. A power cylinder 80ª contains a power piston 87ª which is connected by means of links 93ª and 95ª to the valves 31ª and 65ª, respectively, in order to simultaneously actuate said valves. A four-way valve 120 for controlling the admission and exhaust of air from the power cylinder 80ª is quite different from the valve 102, which performs a similar function in connection with the power cylinder 80. Likewise, the means for effecting actuation of the valve 120 is quite different from the foot operated mechanism described in connection with Fig. 1. A device 115ª similar to the device 115 introduces plastic or semi-solid material under pressure into the metering cylinder 24ª. This modified apparatus will now be discussed in detail.

In order to render the container-filling apparatus semi-automatic in its operation, an upright rod 121 is positioned with the upper end 122 thereof disposed adjacent one side of a filling mandrel 52ª so that the rim of a container X₁ will engage said end as said container is mounted upon the mandrel for filling. As will be apparent from Fig. 7, a sudden or rapid movement of the container X₁ downwardly upon the filling mandrel 52ª will impart a like movement to the rod 121. Such downward movement of the rod 121 is utilized to actuate the power cylinder control valve 120 for admitting and exhausting air from the power cylinder 80ª, as will be explained hereinafter. The lower end 123 of the rod 121 carries a saddle 124 (Fig. 8) adapted to engage a part of the mechanism of the valve 120 to effect actuation thereof.

Figs. 8 to 16, inclusive, illustrate in detail the semi-automatic control valve 120 for the power cylinder 80ª. As shown in Fig. 8, the valve 120 comprises a main body portion 125 secured to a mounting bracket 126 by bolts 127. The bracket 126 may be mounted upon the apparatus in any suitable place. A block 128 rests upon the upper surface of the body 125 at one end thereof and a plate 129 overlies said block, said plate and block being secured to said body by suitable bolts 130. The plate 129 is further secured to the block 128 by relatively short bolts 131. A pair of arms 132, one disposed upon each side of the body 125, is pivotally connected to said body by a pin 133. The opposite ends of said arms are connected together by a generally U-shaped plate 134 arranged so that its legs 135 and 135ª straddle the body 125, as best shown in Fig. 10.

A rigid frame 125ª comprising a pair of bars 136 is pivotally mounted upon the pin 133 exteriorly of the arms 132, as is best shown in Fig. 9. The bars 136 are rigidly connected together intermediate their ends by a cross brace 137 which may be secured in place by welding, or otherwise. The ends of the bars 136 remote from the pivot pin 133 carry a pin 138 held in place by cotter pins 139. A sleeve 140 surrounds the pin 138 and serves as a spacer for the free ends of the bars 136. The sleeve 140 is adapted to be engaged by the saddle 124 carried by the lower end of the rod 121, as indicated in Fig. 8. A second plate 141 is arranged in spaced relation to the plate 129 and is secured to the body 125 by means of a bolt 142.

A pair of toggle members 143 and 144, respectively, is disposed between the arms 132 and the rigid frame 125ª. Each of said toggle members comprises a pair of links 143ª and 144ª, respectively, one of which links is pivotally connected to the arms 132 at 145 and the other of which is pivotally connected to the frame 125ª at 146. The respective links of the toggle members 143 and 144 are pivotally connected together at 143ᵇ and 144ᵇ. The links connected to the arms 132 include a longitudinal extension 147 adapted to engage with a pin 148 carried by the other of said links to maintain said links in a substantially straight line so that a thrust force can be transmitted therethrough. The upper links of the toggle members 143 and 144 are connected by a transverse pin 149 disposed between spaced stops or abutments 150 and 151 carried by the plates 129 and 141, respectively. The stops 150 and 151 may take the form of bolts threadedly mounted in said plates to provide for adjustment thereof relative to each other. Lock nuts 150ª and 151ª serve to maintain the stops 150 and 151 in the desired position of adjustment. One end of the frame 125ª is connected to one end 153 of a tension spring 152 and the opposite end of said spring is secured to a suitable fixed element 154 of the machine. The spring 152 is arranged to exert an upward force on the frame 125ª to return said frame to its initial position after depression of the rod 121 and to engage the transverse pin 149 with the stop 150 to effect straightening of the toggle members 143 and 144.

The body 125 carries a valve block generally indicated at 155. The valve block 155 is provided with a longitudinal bore 156 adapted to receive one end of a valve core 157. The opposite end of said valve core is suitably supported in a bearing block 158. The valve block 155 and bearing block 158 may be welded or otherwise secured to the body 125. The valve block 155 is further provided with main ports 159 and 160 extending vertically and intersecting the bore 156 as best shown in Fig. 12. The valve block 155 is further provided with main ports 161 and 162 which extend horizontally of said block and also intersect the bore 156.

An inlet pipe 163 for air under pressure is connected to the valve block 155 directly above the port 159 and an exhaust pipe 164 is connected to said block directly below the port 160, said exhaust pipe extending through a suitable opening 165 in the body 125 and opening to the atmosphere. A pipe 166 is connected to the valve block 155 at one side of the port 161 and communicates with one end of the power cylinder 80ª. A second pipe 167 is connected to the valve block 155 adjacent the port 162 and communicates with the opposite end of said power cylinder.

The valve core 157 is generally circular in cross-section and fits snugly in the bore 156. Portions of said core are cut away at a point in alignment with the passageways 159 to 162 to provide main ports 168 and 169 separated by a flat diametrical web. These ports cooperate with the main ports 159—162 of the valve block 155 to provide a four-way valve.

In order to reduce friction and facilitate ease of operation of the valve core 157, said valve core and valve block 155 are provided with a series of balancing ports, which will now be described.

In the course of manufacture of the valve block 155, a relatively small passageway 170 is angularly drilled in the side of said block so that it communicates with the main inlet port 159. A pair of spaced vertical ports 171 and 172 are drilled in the block 155 and intersect the valve bore 156 so that ports 171a and 172a are formed in said block below said bore. A horizontal passageway 173 communicates with the port 171a and a second horizontal passageway 174 communicates with port 172a. A longitudinal passageway 175 connects the passageways 173 and 174 and a vertical passageway 176 disposed upon one side of the bore 156 connects the passageways 170 and 175. The outer end of each of the passageways 170, 173, 174, 175 and 176 is plugged so as to prevent the escape of air under pressure from the valve block 155. The upper end of each of the ports 171 and 172, on the other hand, is left open so that these ports are always open to the atmosphere.

The valve core 157 has additional portions thereof cut away to provide a set of balancing ports 177 and 178 (Fig. 16) spaced longitudinally from the main ports 168 and 169, and a second set of balancing ports 179 and 180 on the other side of the ports 168 and 169. The ports 177 and 178 are separated by a diametrical web and are so located along the valve core 157 that they are in alignment with the ports 171 and 171a. The ports 179 and 180 are also separated by a diametrical web and are located so that they are in alignment with the ports 172 and 172a. It will be noted that the web separating the main ports 168 and 169 is disposed in the same plane as the webs separating the balancing ports 177—178 and 179—180, and it will be understood that the ports of the valve core are so designed that the sum of the projected areas of the webs of the balancing ports is equal to that of the web of the main ports.

It will be clear from the foregoing that when the valve core 157 is in the position shown in full lines in Fig. 12, air under pressure can enter the power cylinder 80a through the supply pipe 163, ports 159, 168, 161 and pipe 166; the web portion of the core between the ports 168 and 169 assuming an angle of repose of about 45°. Thus, the air pressure effective upon the port 168 resolves itself into components exerting downward and lateral thrust on the valve core 157. At the same time, these components are balanced by equal and opposite components effective upon the balancing ports 178 and 180 on the opposite side of the valve core 157; the air being admitted to act upon the port 178 through the passageways 170, 176, 173 and port 171a, and to act upon the port 180 through the passageways 170, 176, 175, 174 and port 172a. In the meantime, atmospheric pressure acting upon the main port 169 through exhaust pipe 164 and port 160 is balanced by atmospheric pressure acting upon the balancing ports 177 and 179 through the ports 171 and 172, respectively.

The valve core 157 is designed to be rotated through an angle of about 90°. Such rotation will position the web between the valve core ports in the position shown in dot-and-dash lines in Fig. 12. When the ports in the valve core 157 are in the dot-and-dash line position, the effective pressure on the valve core will be balanced in a manner similar to that previously described, except that the pressure on the port 169 will now be balanced by pressure acting upon the ports 177 and 179 and atmospheric pressure acting upon the port 168 will be balanced by atmospheric pressure acting upon the ports 178 and 180. In this manner, the effective pressure on the valve core is balanced at all times and said valve, therefore, can be readily turned in the valve block 155 by the application of only a slight turning force.

A hub member 185 is rotatably mounted upon the valve core 157 adjacent the bearing block 158. A lobe 186 projects radially from the hub 185 and carries pins 187 and 188, projecting from the opposite sides thereof. One end of a pendulum or operating arm 189 is rigidly secured to the lobe 186 and the opposite end of said arm carries a weight 190.

A collar 191 is non-rotatably secured to the core 157 between the hub 185 and the valve block 155. An arcuate recess or slot 192 formed in a side of said collar is adapted to receive the pin 188. The arcuate recess 192 terminates in substantially radial end walls 193 and 194 which serve as abutments for the pin 188, as will be described more fully hereinafter.

The pendulum arm 189, while it is free to rotate on the valve core 157, has its angle of movement limited by a stop means 195, located on opposite sides of member 125 (Fig. 10). Stop means 195 consists of a bracket designed as a buffer to take the impact of weight 190. Leather pad 196 is secured to the upper surface of the bracket which acts as a cushion. Brackets 195 are secured to member 125 by means of bolts 197.

The arm 189 and the weight 190 serve as a swingable pendulum arm for effecting rotation of the valve core 157. When there is no container upon the filling spout 52a, the toggle members 143 and 144 assume the position shown in Fig. 8 and the pendulum arm 189 assumes the position shown in full lines in Fig. 10.

As an empty inverted container is moved downwardly relative to the filling spout 52a, its rim engages the upper end of the rod 121 and causes said rod to move downwardly. The container is preferably moved downward quickly so as to impart a sudden movement to the rod 121. In view of the fact that the saddle 124 carried by the lower end of the rod 121 is engaged with the sleeve 140, it will impart a corresponding sudden downward movement to the free end of the rigid frame 125a against the action of spring 152, thereby causing said frame to pivot about the pin 133. The links of the toggle members 143 and 144, being in alignment, transmit thrust from the frame 125a to the arms 132 to cause said arms to similarly pivot about the pin 133. Upon continued downward movement of the rod 121, the transverse pin 149 will engage the stop 151 and pivot the upper of the toggle links about the pin 146, thus effecting a "break" in the toggle members. During the downward movement of the rod 121, and prior to the breaking of the toggle members 143 and 144, the striker 199 associated with the leg 135 will, of course, move upwardly and engage the pin 187 to impart an impulse to the pendulum arm 189 sufficient to overcome the inertia of the weight 190 and cause said arm to flop over through a vertical plane passing through the axis of rotation so that it comes to rest in the position indicated in dot-and-dash lines in Fig. 10. The impulse resulting in the aforedescribed actuation of the pendulum arm 189 is produced, as stated, prior to breaking of the toggle members 143—144 so that the rigid frame 125a can thereafter pivot downwardly independent of the arms 132 against the resistance offered by the spring 152. At the same time, further upward movement of the striker 199 would be limited by the engagement of the edge 200 of the U-shaped member 134 with the lower side of the body 125.

As will be noted from Fig. 10, the pendulum arm 189 with its weight 190 moves through a total angle of about 180°. The valve core 157, however, need only be moved through an angle of approximately 90° to shift the main ports 168 and 169 of said valve core from one operative position to the other. Hence, during about the first half of the travel of the pendulum arm 189 the pin 188 traverses the slot 192 and imparts no rotation to the valve core 157, but, as said arm reaches approximately its vertical position, said pin strikes against the abutment surface 194 of said slot and causes said valve core to thereafter rotate therewith through the remainder of its movement. Thus, a lost-motion connection is provided between the pendulum arm 189 and the valve core 157. By the time that the pin 188 engages the abutment surface 194, the pendulum arm 189 is traveling at a substantial velocity so that said pin strikes said abutment surface with a hammer-like effect and readily overcomes the inertia and any static friction that may be opposing free rotation of the valve core 157 in the valve block 155.

The pendulum arm 189 will now remain in the position shown in dot-and-dash lines in Fig. 10 until the container has been filled and removed from the mandrel 52a. The removal of the container, or the gradual elevation of the container relative to the mandrel during the filling operation relieves the downward force acting upon the rod 121. As this force is released, the spring 152 pulls upwardly on the frame 125a causing it to pivot relatively to the pin 133. This relative movement carries the transverse pin 149 upwardly into engagement with the end of the stop 150 so that the toggle members become straightened, with the extension 147 engaging the pin 148. Meanwhile, a second striker 201 (Fig. 10) at the upper extremity of the leg 135a assumes a position a short distance below the pin 187 of the pendulum or operating arm 189 preparatory to engaging said pin to cause said arm to swing back to its original position and effect a second filling operation upon the next sudden depression of the rod 121.

It will be understood from the foregoing that the metering cylinder 24a and the booster cylinder 16a operate in the same manner described in connection with metering cylinder 24 and the booster cylinder 16, and that the use of the semi-automatic valve 120 enables the filling of containers to proceed rapidly and efficiently without requiring the operator to use his hands or feet to actuate any specific control means for the power cylinder 80a, the actuation of said cylinder and the remainder of the apparatus occurring automatically as empty containers are moved downward relatively to the mandrel 52a. The automatic arrangement has the added advantage that the metering cylinder normally cannot be operated unless a container is in filling position.

While both manual and semi-automatic control means have been disclosed herein for controlling the operation of the power cylinder, which in turn controls the operation of the control valves for the metering and booster cylinders, it will be understood that means other than that specifically disclosed herein may be devised to effect the same result. Accordingly, it is contemplated that numerous variations and changes may be made in the structure of the apparatus disclosed herein without departing from the principles of the invention or the scope of the appended claims.

I claim:

1. An apparatus for filling containers with plastic or semi-solid material comprising: a metering cylinder; a container-filling spout operatively associated with said metering cylinder; a metering piston in said metering cylinder for ejecting material from said metering cylinder through said container-filling spout; a booster cylinder; a booster piston in said booster cylinder; a piston rod rigidly interconnecting said metering and booster pistons; a valve for controlling the inlet and discharge of material from said metering cylinder; a valve for controlling the admission and exhaust of operating fluid to said booster cylinder; a power cylinder; a power piston in said power cylinder; a valve for controlling the admission and exhaust of operating fluid to said power cylinder; and means operatively connecting said power piston with the control valves for said metering and booster cylinders.

2. An apparatus for filling containers comprising: a metering cylinder, said cylinder having passageways communicating with the opposite ends thereof, each of said passageways being arranged to successively serve as inlet and discharge passageways; a metering piston reciprocably mounted in said metering cylinder and adapted to displace a given quantity of material from said metering cylinder upon each stroke thereof; valve means controlling the admission of said material into and the discharge of said material from said metering cylinder; a container-filling spout operatively connected with said valve means and metering cylinder adapted to be placed in communication with the particular passageway through which material is being discharged from said metering cylinder; a booster cylinder; a booster piston reciprocably mounted in said booster cylinder; valve means controlling the admission and exhaust of operating fluid to said booster cylinder; means connecting said metering and booster pistons together for reciprocation as a unit; means interconnecting said valve means to effect simultaneous operation thereof; power means for operating the aforementioned valve means including a power cylinder, a power piston in said power cylinder, means connecting said power piston with said valve-interconnecting means, and valve means controlling the admission and exhaust of operating fluid to said power cylinder.

3. An apparatus for filling containers comprising: a metering cylinder adapted to receive plastic or semi-solid material, said cylinder having passageways communicating with the opposite ends thereof, each of said passageways being arranged to successively serve as inlet and discharge passageways; a metering piston reciprocably mounted in said metering cylinder and adapted to displace a given quantity of material from said metering cylinder upon each stroke thereof; a valve controlling the admission of said material into and the discharge of said material from said metering cylinder; means for introducing said material into said metering cylinder under pressure through one of said passageways while material is being displaced from said metering cylinder through the other of said passageways; a container-filling spout operatively connected with said valve and metering cylinder adapted to be placed in communication with the particular passageway through which material is being displaced from said metering cylinder, said container-filling spout having a discharge orifice opening upwardly so that a container must be placed thereover in an inverted position; a booster cylinder; a booster piston reciprocably mounted in said booster cylinder; a valve controlling the admission and exhaust of operating fluid to said booster cylinder; a piston rod connecting said metering and booster pistons together for reciprocation as a unit; means for limiting the travel of said piston rod; means interconnecting said valves to effect simultaneous operation thereof; power means for operating the aforementioned valves including a power cylinder, a power piston in said power cylinder, means connecting said power piston with said valve-interconnecting means, and a manually actuated valve controlling the admission and exhaust of operating fluid to said power cylinder.

4. An apparatus for filling containers comprising: a metering cylinder adapted to receive plastic or semi-solid material, said cylinder having passageways communicating with the opposite ends thereof, each of said passageways being arranged to successively serve as inlet and discharge passageways; a metering piston reciprocably mounted in said metering cylinder and adapted to displace a given quantity of material from said metering cylinder upon each stroke thereof; a valve controlling the admission of said material into and the discharge of said material from said metering cylinder; means for introducing said material into said metering cylinder under pressure through one of said passageways while material is being displaced from said metering cylinder through the other of said passageways; a container-filling spout operatively connected with said valve and metering cylinder adapted to be placed in communication with the particular passageway through which material is being displaced from said metering cylinder; a booster cylinder; a booster piston reciprocably mounted in said booster cylinder; a valve controlling the admission and exhaust of operating fluid to said booster cylinder; a piston rod connecting said metering and booster pistons together for reciprocation as a unit; means for limiting the stroke of said pistons; means interconnecting said valves to effect simultaneous operation thereof; power means for operating the aforementioned valves including a power cylinder, a power piston in said power cylinder, means connecting said power piston with said valve-interconnecting means, and a foot-operated valve controlling the admission and exhaust of operating fluid to said power cylinder.

5. A container-filling apparatus comprising: a cylinder adapted to receive plastic or semi-solid material; a container-filling spout connected with said cylinder; a metering piston in said cylinder; valve means controlling the admission of said material to and the discharge of said material from said cylinder; means for introducing said material under pressure into said cylinder; a booster cylinder; a booster piston in said booster cylinder; valve means controlling the admission and exhaust of operating fluid to said booster cylinder; a piston rod interconnecting said metering and booster pistons; and means including an element adjacent said container-filling spout operable by moving an empty container relative to said spout for effecting simultaneous actuation of said valve means.

6. An apparatus for filling containers comprising: a metering cylinder; valve means for controlling the admission of material into and the discharge of material from said metering cylinder; a metering piston in said metering cylinder; a mandrel having an orifice through which material may be discharged from said metering cylinder; a booster cylinder; a booster piston in said booster cylinder; means connecting said metering and booster pistons together so that said pistons move as a unit; valve means for controlling the admission and exhaust of operating fluid to said booster cylinder; means interconnecting said valve means to effect simultaneous operation thereof; a power cylinder; a power piston in said power cylinder; means connecting said power piston with said valve-interconnecting means; and a valve controlling the admission and exhaust of operating fluid to said power cylinder, said valve including a valve block, a core rotatably mounted in said valve block, a pendulum operatively connected with said valve core, a striker adapted to engage said pendulum to impart an impulse thereto sufficient to overcome its inertia and to cause rotation of said valve core, and manually operated means for actuating said striker.

7. An apparatus for filling containers comprising: a metering cylinder; valve means for controlling the admission of material into and the discharge of material from said metering cylinder; a metering piston in said metering cylinder; a mandrel having an orifice through which material may be discharged from said metering cylinder, said orifice opening upwardly so that a container must be placed over said mandrel in an inverted position; a booster cylinder; a booster piston in said booster cylinder; means connecting said metering and booster pistons together so that said pistons move as a unit; valve means for controlling the admission and exhaust of operating fluid to said booster cylinder; means interconnecting said valve means to effect simultaneous operation thereof; a power cylinder; a power piston in said power cylinder; means connecting said power piston with said valve-interconnecting means; and a valve controlling the admission and exhaust of operating fluid to said power cylinder, said valve including a valve block, a core rotatably mounted in said valve block, a pendulum operatively connected with said valve core, a striker adapted to engage said pendulum to impart an impulse thereto sufficient to overcome its inertia and to cause rotation of said valve core, and means for actuating said striker including a member positioned adjacent said mandrel and adapted to be depressed suddenly by an empty container as said container is positioned upon said mandrel for filling.

8. An apparatus for filling containers comprising: a metering cylinder adapted to receive plastic or semi-solid material, said cylinder having passageways communicating with the opposite ends thereof, each of said passageways being arranged to successively serve as inlet and discharge passageways; a metering piston reciprocably mounted in said metering cylinder and adapted to displace a given quantity of material from said metering cylinder upon each stroke thereof; valve means controlling the admission of said material into and the discharge of said material from said metering cylinder; means for introducing said material into said metering cylinder under pressure through one of said passageways while material is being displaced from said metering cylinder through the other of said passageways; a container-filling spout operatively associated with said valve means and metering cylinder adapted to be connected with the particular passageway through which material is being displaced from said metering cylinder, said container-filling spout having a discharge orifice opening upwardly so that a container must be placed thereover in an inverted position; a booster cylinder; a booster piston reciprocably mounted in said booster cylinder; valve means controlling the admission and exhaust of operating fluid to said booster cylinder; a piston rod connecting said metering and booster pistons together for reciprocation as a unit; means interconnecting said valve means to effect simultaneous operation thereof; power means for operating the aforementioned valve means including a power cylinder, a power piston in said power cylinder, means connecting said power piston with said valve-interconnecting means, and valve means controlling the admission and exhaust of operating fluid to said power cylinder; and a member adjacent said container-filling spout adapted to be engaged by the rim of an empty container to effect actuation of said last-mentioned valve means as said container is positioned over said spout preparatory to filling.

9. An apparatus for filling containers comprising: a metering cylinder adapted to receive plastic or semi-solid material, said cylinder having passageways communicating with the opposite ends thereof, each of said passageways being arranged to successively serve as inlet and discharge passageways; a metering piston reciprocably mounted in said metering cylinder and adapted to displace a given quantity of material from said metering cylinder upon each stroke thereof; a four-way valve controlling the admission of said material into and the discharge of said material from said metering cylinder; means for introducing said material into said metering cylinder under pressure through one of said passageways while material is being displaced from said metering cylinder through the other of said passageways; a container-filling spout operatively associated with said four-way valve and metering cylinder adapted to be connected with the particular passageway through which material is being displaced from said metering cylinder; a booster cylinder; a booster piston reciprocably mounted in said booster cylinder; a four-way valve controlling the admission and exhaust of operating fluid to said booster cylinder; a piston rod connecting said metering and booster pistons together for reciprocation as a unit; means for limiting the stroke of said pistons; means interconnecting said four-way valves to effect simultaneous operation thereof; power means for operating the aforementioned four-way valves including a power cylinder, a power piston in said power cylinder, means connecting said power piston with said valve-interconnecting means, and a manually actuated four-way valve controlling the admission and exhaust of operating fluid to said power cylinder.

10. An apparatus for filling containers comprising: a metering cylinder adapted to receive plastic or semi-solid material, said cylinder having passageways communicating with the opposite ends thereof, each of said passageways being arranged to successively serve as inlet and discharge passageways; a metering piston reciprocably mounted in said metering cylinder and adapted to displace a given quantity of material from said metering cylinder upon each stroke thereof; a four-way valve controlling the admission of said material into and the discharge of said material from said metering cylinder; means for introducing said material into said metering cylinder under pressure through one of said passageways while material is being displaced from said metering cylinder through the other of said passageways; a container-filling mandrel operatively associated with said four-way valve and metering cylinder adapted to be connected with the particular passageway through which material is being displaced from said metering cylinder, said container-filling mandrel having a discharge orifice opening upwardly so that a container must be placed thereover in an inverted position; a booster cylinder; a booster piston reciprocably mounted in said booster cylinder; a four-way valve controlling the admission and exhaust of operating fluid to said booster cylinder; a piston rod connecting said metering and booster pistons together for reciprocation as a unit; means for limiting the stroke of said booster piston; means interconnecting said four-way valves to effect simultaneous operation thereof; power means for operating the aforementioned four-way valves including a power cylinder, a power piston in said power cylinder, means connecting said power piston with said valve-interconnecting means, and a pendulum actuated four-way valve controlling the admission and exhaust of operating fluid to said power cylinder; and a member adjacent said container-filling mandrel adapted to be engaged by the rim of an empty container to effect actuation of said last-mentioned four-way valve as said container is positioned over said mandrel preparatory to filling.

11. A container-filling apparatus comprising: a metering cylinder; a booster cylinder; valve means for controlling said metering and booster cylinders, respectively; means interconnecting said valve means to effect simultaneous operation thereof; a power cylinder for actuating said interconnected valve means; and a valve for controlling the admission and exhaust of operating fluid from said power cylinder, said last-mentioned valve comprising a rotatable core, a pendulum arm operatively connected with said core to effect rotation thereof; and striker means arranged to engage said pendulum arm to cause the same to swing and thereby effect rotation of said valve core.

CHARLES T. WALTER.